1,379,228
1,379,229

UNITED STATES PATENT OFFICE.

NICHOLAS W. TRAUTNER, OF ST. PAUL, MINNESOTA.

GREASE-CUP.

1,379,230.　　　Specification of Letters Patent.　　Patented May 24, 1921.

Application filed September 27, 1920.　Serial No. 412,975.

*To all whom it may concern:*

Be it known that I, NICHOLAS W. TRAUTNER, a citizen of the United States, residing at St. Paul, in the county of Ramsey and State of Minnesota, have invented a new and useful Grease-Cup, of which the following is a specification.

This invention relates to grease cups or the like, it being an object of the invention to provide means employed in connection with the movable element or plunger of the grease cup, to lock the plunger against accidental movement.

A further object of the invention is to provide a device of this character including a coiled spring and a laterally movable member adapted to be forced into engagement with the threads of the grease cup to restrict movement of the plunger by frictional contact with the threads of the grease cup.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a vertical sectional view of a grease cup constructed in accordance with the present invention.

Fig. 2 illustrates a sectional view taken on line 2—2 of Fig. 1.

Fig. 3 is a vertical section on line 3—3 of Fig. 1.

Referring to the drawing in detail, the cup proper is indicated by the reference character 5, the cup being provided with the usual internal screw threads 6 which coöperate with the plunger 7, or movable element of the grease cup, and which forces the grease therefrom.

This plunger 7 is preferably hollow and provided with a partition 8 partitioning the plunger into an upper compartment 9 and a lower compartment 10, the lower compartment 10 being designed to house the coiled spring 11 which has one extremity thereof seated in the recessed portion 12 formed in the inner wall of the compartment 10, so that lateral movement of the spring 11 within the compartment 10, is prevented.

A circular opening is formed in the wall of the compartment 10 and accommodates the movable jaw 13 which is preferably circular in formation to conform to the circular opening in which the same is positioned, the jaw however being of a diameter to move freely within the opening, to accomplish the locking result.

This movable jaw is also provided with a threaded surface to move in the threads of the grease cup to set up a binding action between the threads of the movable jaw and threads of the grease cup to restrict movement of the plunger with relation to the grease cup. As shown, the movable jaw 13 is provided with an extension 14 providing a stop for one end of the coiled spring 11, to connect the coiled spring and movable plunger, the coiled spring being provided to normally urge the movable jaw 13 outwardly into close engagement with the threads of the cup proper. Thus it will be seen that the binding action which is set up between the movable jaw and inner threads of the cup, is sufficient to prevent rotary movement of the plunger accidentally, as by jarring the machine to which the grease cup is applied.

The upper compartment 9 of the plunger, is provided with angular walls indicated at 15 to accommodate a wrench, so that the plunger may be rotated within the cup proper to force grease from the cup.

Having thus described the invention, what is claimed as new is:—

1. In a device of the character described, a cup having internal threads, a plunger movable within the cup and having a lateral opening, a coiled spring disposed within the plunger, and means disposed within the opening and contacting with the coiled spring for engaging the internal threads of the cup for restricting movement of the plunger.

2. In a device of the character described, a cup section having internal screw threads, a plunger having a threaded periphery and operating within the cup section, said plunger having an opening formed in the wall thereof, a movable jaw positioned within the opening, a spring contacting with the movable jaw for forcing the jaw into engagement with the threads of the cup to restrict movement of the plunger with relation to the cup.

In testimony that I claim the foregoing as my own, I have hereto affixed my signature in the presence of two witnesses.

NIC. W. TRAUTNER.

Witnesses:
C. W. DIXON,
OTTO F. DUTHERT.